(12) United States Patent
Oshitani et al.

(10) Patent No.: US 7,526,360 B2
(45) Date of Patent: Apr. 28, 2009

(54) METHOD AND APPARATUS FOR DESIGNING MOLDS

(75) Inventors: Akira Oshitani, Atsugi (JP); Hatsuko Kouroku, Atsugi (JP); Takahisa Yamada, Atsugi (JP); Tadashi Shimizu, Kariya (JP); Chiharu Kamiya, Kariya (JP); Yutaka Takamatsu, Kariya (JP)

(73) Assignees: Fujitsu Limited, Kawasaki (JP); Shimizu Industry Co., Ltd., Kariya (JP)

( * ) Notice: Subject to any disclaimer, the term of this patent is extended or adjusted under 35 U.S.C. 154(b) by 879 days.

(21) Appl. No.: 10/125,516

(22) Filed: Apr. 19, 2002

(65) Prior Publication Data
US 2002/0161472 A1    Oct. 31, 2002

(30) Foreign Application Priority Data
Apr. 27, 2001  (JP) .............................. 2001-132208

(51) Int. Cl.
*G06F 19/00*    (2006.01)
*G06F 12/00*    (2006.01)
*G06F 17/50*    (2006.01)

(52) U.S. Cl. ........................ 700/197; 700/98; 700/182; 700/183; 707/200; 715/964; 703/1

(58) Field of Classification Search ..................... 700/9, 700/19, 97, 98, 182–184, 197, 204, 146, 700/206; 345/418; 715/964; 707/200; 703/1
See application file for complete search history.

(56) References Cited

U.S. PATENT DOCUMENTS

| | | | | |
|---|---|---|---|---|
| 5,095,419 | A * | 3/1992 | Seki et al. ..................... 700/83 |
| 5,659,493 | A * | 8/1997 | Kiridena et al. ................. 703/2 |
| 5,812,402 | A * | 9/1998 | Nishiyama et al. ............ 700/97 |
| 6,233,499 | B1 * | 5/2001 | Matsumoto .................. 700/197 |
| 6,627,835 | B1 * | 9/2003 | Chung et al. ............. 219/69.12 |
| 6,775,581 | B2 * | 8/2004 | Landers et al. ................ 700/98 |
| 2002/0133264 | A1 * | 9/2002 | Maiteh et al. ............... 700/182 |

* cited by examiner

*Primary Examiner*—Sean P. Shechtman
(74) *Attorney, Agent, or Firm*—Staas & Halsey LLP (57) ABSTRACT

A design apparatus for efficiently designing a mold that has improved quality. The mold is manufactured by removing cutting area from a mold material. The apparatus includes a database for storing geometry data, which represents a shape of the mold, and a further database for storing process data, which represents the shape of the cutting area, in association with the geometry data.

7 Claims, 10 Drawing Sheets

Mold Structure Information Database

| No. | Part No. | Part Type | Dimensions (mm) | Mold Info. | Non-Cutting Area Info. |
|---|---|---|---|---|---|
| 1 | A | 01 | | | AA |
| 2 | | 02 | | | AB |
| 3 | | 03 | | | AC |

Non-Cutting Area

| No. | Part No. | Part Type | Dimensions (mm) | Mold Info. | Non-Cutting Area Info. |
|---|---|---|---|---|---|
| 1 | AA | 10 | | | Aa |
| 2 | AB | 11 | | | Aa |
| 3 | AC | 12 | | | Ab |

Cutting Area

| No. | Part No. | Part Type | Quantity | Dimensions (mm) | Volume (cm³) | Machining Time | Tolerance | Operation Info. |
|---|---|---|---|---|---|---|---|---|
| 1 | Aa | 20 | 3 | | | | | |
| 2 | Ab | 21 | 2 | | | | | |
| 3 | Ac | 22 | 5 | | | | | |

METHOD AND APPARATUS FOR DESIGNING MOLDS

BACKGROUND OF THE INVENTION

The present invention relates to a method for manufacturing molds.

Conventionally, computer-aided design (CAD) systems are employed to design molds, which are used to form molded products. A CAD system uses data representing the geometry of a molded product to design a mold in correspondence with the geometry of the molded product. That is, the CAD system generates design data for the mold of the molded product using data representing the finish geometry and dimension of the molded product. A computer-aided manufacturing (CAM) system generates numerical control (NC) data, or process data, from the mold design data generated by the CAD system. An NC apparatus machines a workpiece in accordance with the process data to manufacture a mold.

In the prior art, a designer who designs a mold with a CAD system makes changes and modifications to mold design data, which is generated by the CAD system, based on experience. An operator using a CAM system also makes changes and modifications to the process data, which is generated by the CAM system, based on experience.

The design data and the process data represent the finish geometry of the mold and mold parts, which form the mold. In other words, in the prior art, the designing and manufacturing of a mold are performed based on only geometry information (i.e., design data and process data), which represents the finish geometry of the mold and mold parts. The geometry information does not represent machining information, such as the dimensions of the portions machined and removed from a mold material and the time required for the machining.

Accordingly, in the prior art, the geometry information of a mold is associated with the cutting information. This may result in the CAM system generating erroneous process data. Thus, when manufacturing different molds and mold parts that form the same molded product, the resulting mold and mold parts may have differing portions.

Furthermore, the designing process, which is performed by the CAD system, and the manufacturing process, which is performed by the CAM system, are based on only the geometry of the mold. Thus, the manufacturing process cannot be started until the designing process is completed. This requires enormous time for manufacturing the mold.

The process data generated by a CAM system, the information of mold parts that form a mold (unit information), process information, and the know-how accumulated by a machinist are not managed to be shared. Thus, the final mold may differ depending on the persons involved even when using the same information.

A conventional CAD system does not allow displaying the components of mold by unit. Therefore, it is difficult to check information operator requires such as parts list by unit and the progress.

BRIEF SUMMARY OF THE INVENTION

It is an object of the present invention to provide a method and apparatus for efficiently designing a mold having improved quality.

To achieve the above object, the present invention provides a method for designing a mold that is manufactured by machining a mold material. The method includes storing first geometry information of the mold in association with second geometry information of a cutting area, which is removed from the mold, in a database, and designing the mold with the first geometry information and the second geometry information.

A further perspective of the present invention is an apparatus for designing a mold that is manufactured by machining a mold material. The apparatus includes a database for storing first geometry information of the mold in association with second geometry information of cutting area, which is removed from the mold, in a database. A computer-aided design (CAD) system generates design data of the mold from the first geometry information and the second geometry information. A computer-aided manufacturing (CAM) system manages manufacturing of the mold in accordance with the first geometry information, the second geometry information, and the design data.

A further perspective of the present invention is a method for designing a mold unit. The method includes storing in a part database first geometry information of mold parts that are manufactured by removing cutting areas from mold materials, storing in a mold structure information database second geometry information of the cutting areas in association with the first geometry information, retrieving the first geometry information and the second geometry information that is related with at least one of the mold parts from the part database and the mold structure information database to form a mold unit with the at least one of the mold parts, and generating design data for manufacturing the at least one mold part from the retrieved first and second geometry information.

A further aspect of the present invention is an apparatus for designing a mold unit. The apparatus includes a part database for storing first geometry information of mold parts that are manufactured by removing cutting areas from mold materials. A mold structure information database stores second geometry information of the cutting areas in association with the first geometry information. A computer-aided design (CAD) system retrieves the first geometry information and the second geometry information that is related with at least one of the mold parts from the part database and the mold structure information database to form a mold unit with the at least one of the mold parts and to generate design data of the at least one mold part from the retrieved first and second geometry information. A computer-aided manufacturing (CAM) system manages manufacturing of the mold unit in accordance with the first geometry information, the second geometry information, and the design data.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENT

Figure 1:
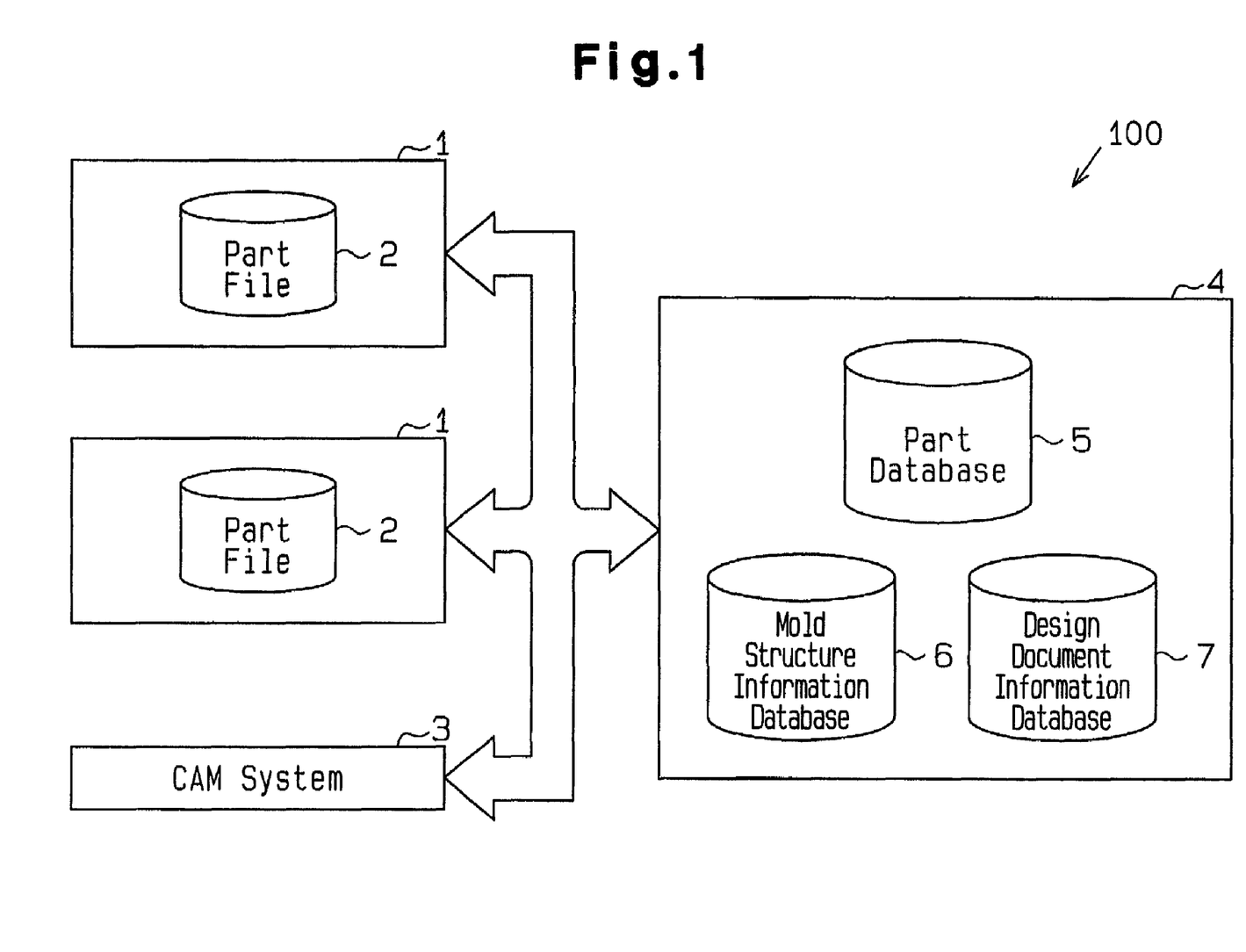
FIG. 1 is a block diagram of a mold design apparatus according to a preferred embodiment of the present invention.

FIG. 1 is a schematic diagram illustrating a mold design apparatus 100 according to a preferred embodiment of the present invention. The design apparatus 100 includes a plurality of CAD systems 1. Each CAD system 1, which is a terminal computer operated by a designer, includes an input device (keyboard), a calculator, a display, and a part file 2 for temporarily storing design data or the like.

Each CAD system 1 is connected to a CAM system 3, which generates process data for manufacturing a mold, and a server computer 4, which stores various databases. The CAM system 3 manages processes for manufacturing molds. For example, the CAM system 3 manages the manufacturing of mold parts and information related with each manufacturing operation, such as the progress of each operation.

The server computer 4 stores a part database 5, a mold structure information database 6, and a design document information database 7.

The part database 5 stores information related to various mold parts, which form a mold. The mold part information includes first information, or geometry data, which represents the finish geometry of a mold part. The geometry data refers to information representing the portions of a mold material that are not removed from the mold material when the mold material is machined. It is preferred that the geometry data be solid data of a three-dimensional CAD.

Figure 6:
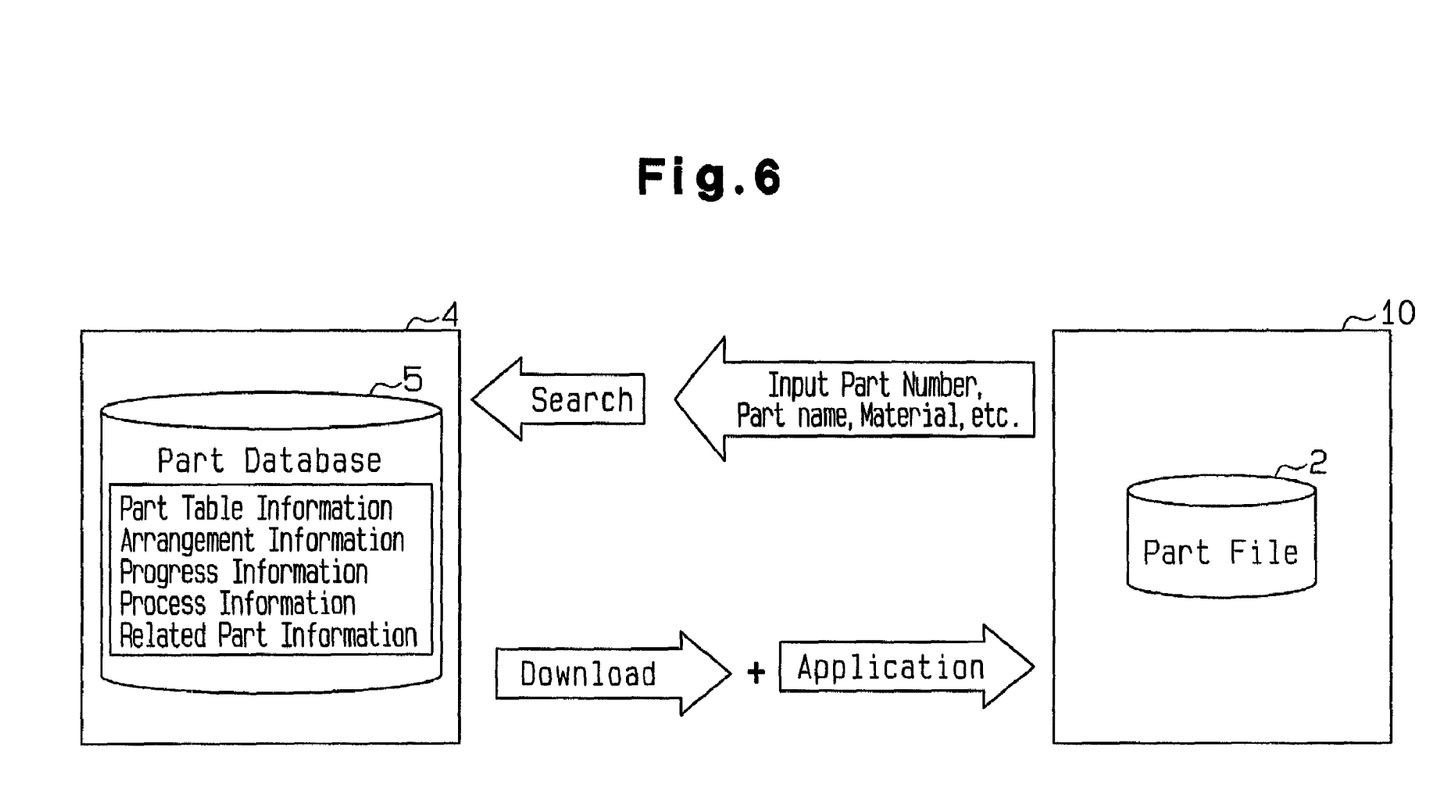
FIGS. 6 to 9 are diagrams illustrating the functions of the mold design apparatus.

Referring to FIG. 6, the part database 5 stores part table information, arrangement information, operation progress information, operation information, and related-part information when registering each mold part.

The mold structure information database 6 stores information of the cutting areas, or process data of the mold parts (second information). The process data is associated with the geometry data of the part database 5. The CAM system 3 generates the process data using the geometry data. The process data is preferably solid data of a three-dimensional CAD.

Figure 2:
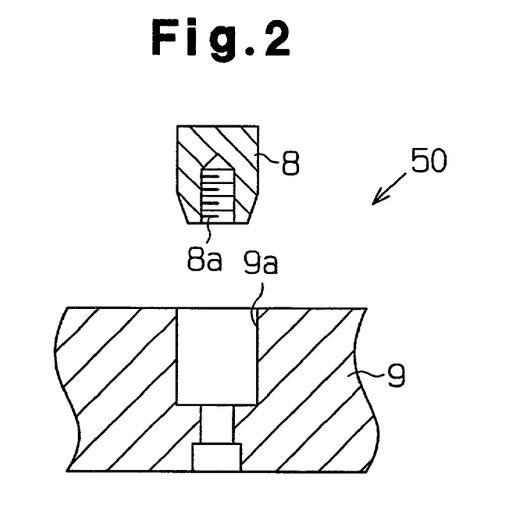
FIG. 2 is a schematic view showing the concept of geometry and process data.

The geometry data and process data will now be discussed. FIG. 2 shows a mold unit 50. The mold unit 50 includes an insert 8, which has a threaded hole 8a, and a mold 9, which has a cavity 9a to receive the insert 8. The insert 8 and the mold 9 are mold parts. When designing the mold unit 50, the CAM system 3 first reads the part information in the part database 5 and obtains geometry data of the insert 8 and the mold 9 from the part information. The CAM system 3 associates the geometry data with the process data and stores the associated data in the mold structure information database 6.

Figure 3:
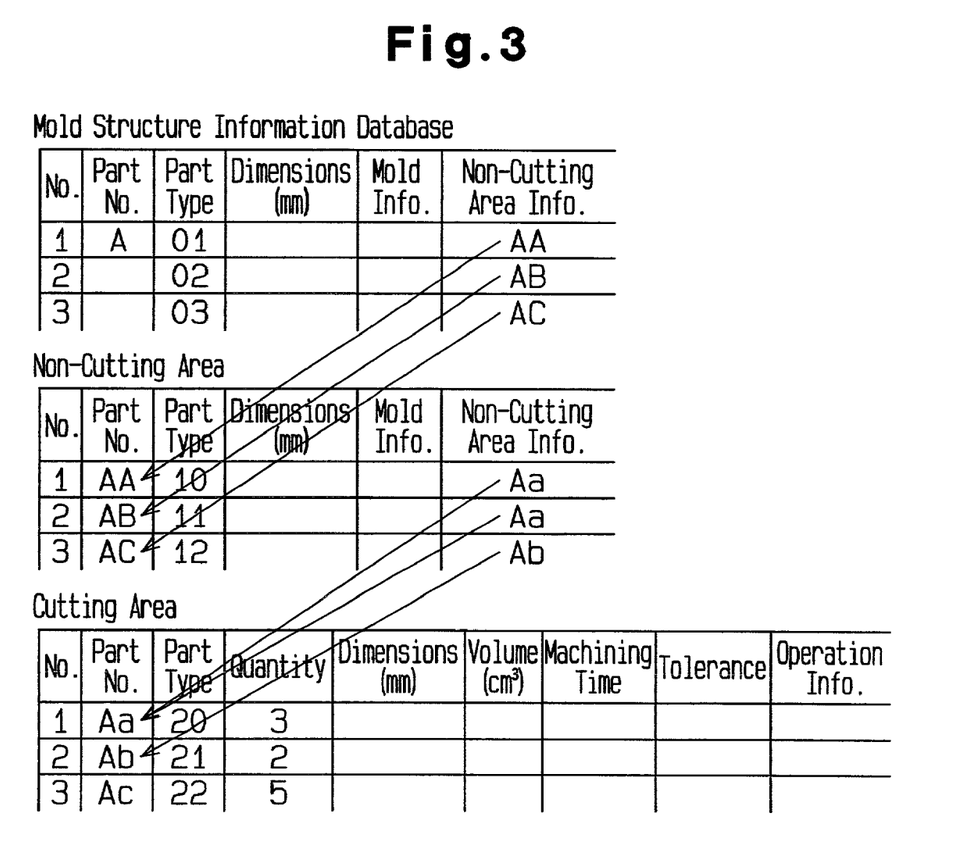
FIG. 3 is a table illustrating geometry data and process data, which are stored in a part database.

For example, referring to FIG. 3, information related to non-cutting areas is associated with information related to cutting areas, or cutting areas. The mold structure information database 6 stores information representing the mold parts (part number, part type, dimensions, mold information, and non-cutting area information).

The non-cutting area information includes non-cutting area numbers, part types, quantity, dimension, volume, machining time, tolerance, and operation information.

The non-cutting area information and the cutting area are stored for each mold unit. That is, referring to FIG. 4, the mold unit 50 is designated a unit ID. The information of the mold unit 50 includes mold part information, or the non-cutting area information (mold part geometry data) of a mold part, and processing geometry information, or cutting area information (process data) of the mating mold part.

Figure 4:
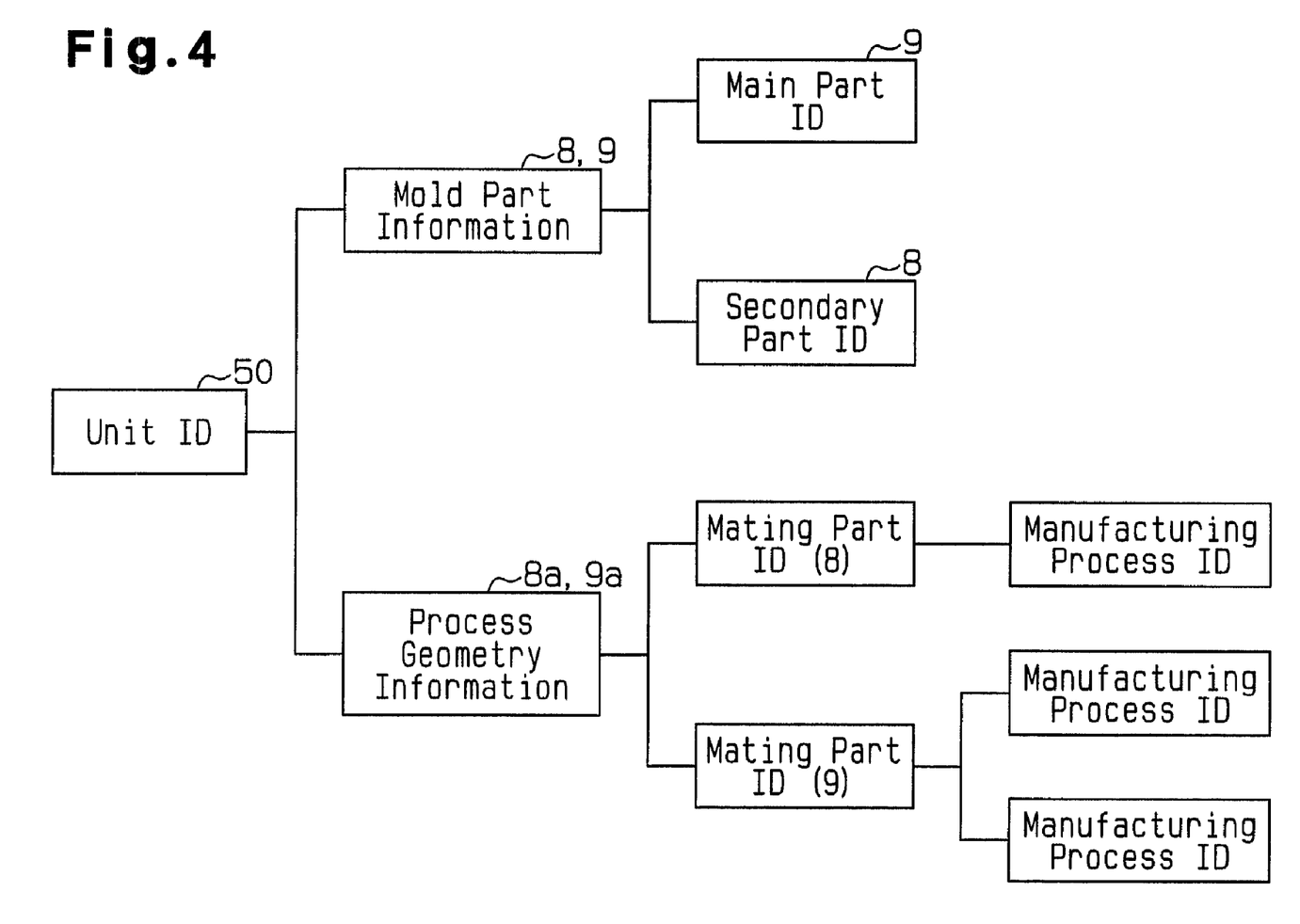
FIG. 4 is a tree chart of information related to a mold unit.

The mold parts are classified into main parts and secondary parts. Each main part and secondary part is designated a part ID. The information of the mold parts includes the information of the main parts and information of the secondary parts.

The process geometry information is stored by associating mold parts that are mated with each other. More specifically, the machining geometry information for cutting area of each of the mold parts 8, 9, which are mated with each other, includes the part ID of the other mold part and an ID of the manufacturing process that removes the cutting areas of the other mold part. The process geometry information is stored in the structure information database 6.

Figure 7:
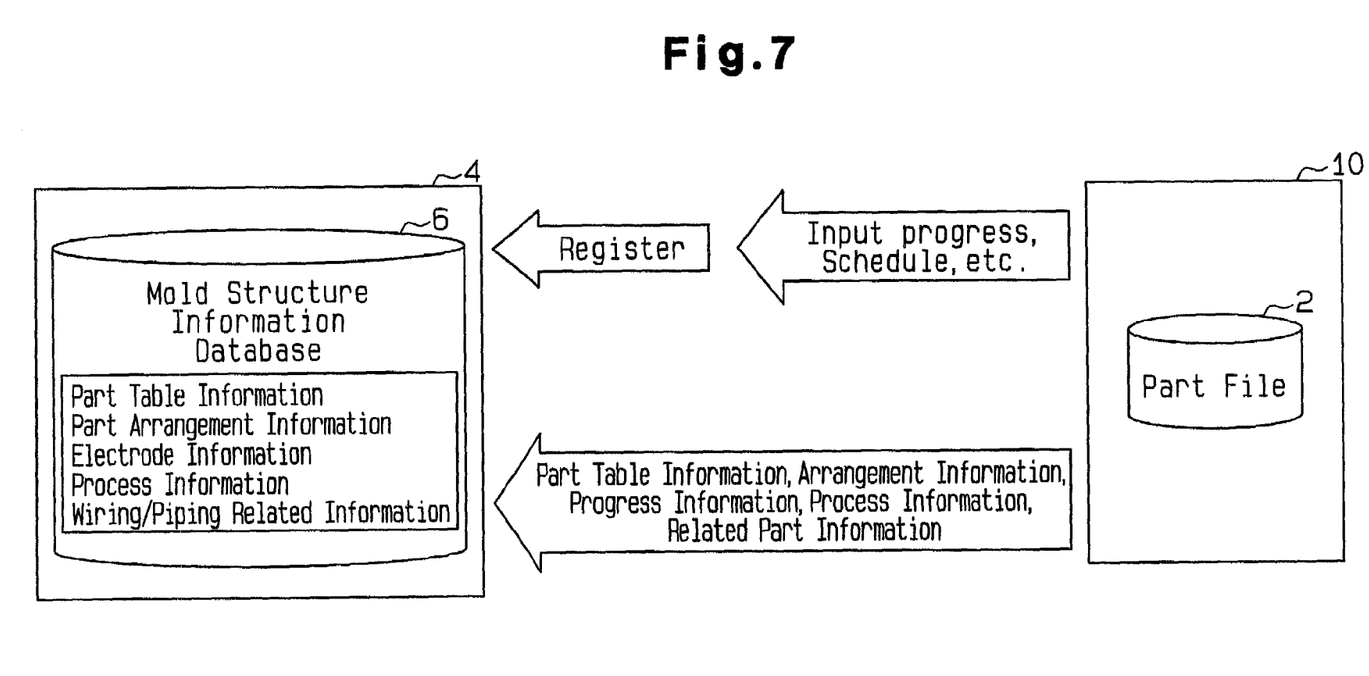

Referring to FIG. 7, the mold structure information database 6 further includes part table information, part arrangement information, electrode information, process information, and wiring/piping-related information.

Figure 5:
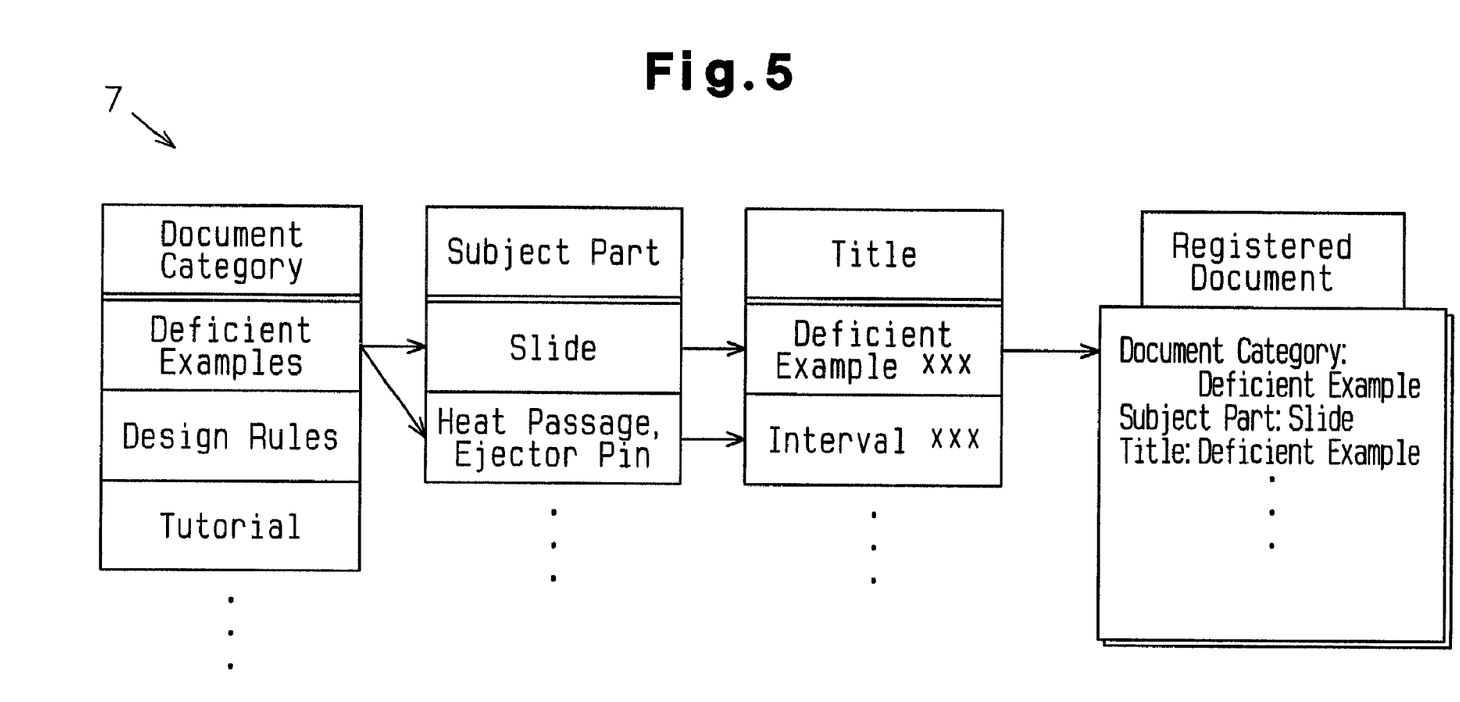
FIG. 5 is a diagram showing the contents of a design document information database.

Referring to FIG. 5, the design document information database 7 stores data of a plurality of documents. For example, the uppermost data hierarchy of each document classifies document categories, such as deficient examples, design rules, and so on. The hierarchy below the document category hierarch classifies subject parts. The next hierarchy classifies, for example, titles of deficient examples. The lowermost hierarchy classifies registered documents describing the contents of, for example, deficient examples.

The operation of the design apparatus 100 will now be discussed.

Referring to FIG. 6, when an operator inputs information of a part that is to be designed, such as a part number, part name, and material, the design apparatus 100 searches for part information matching the input information and retrieves the matching data. The retrieved part information is downloaded to the CAD terminal 10 and processed through a CAD/CAM application. The design apparatus 100 stores the part information in the part file 2 of the CAD terminal 10.

The design apparatus 100 obtains the process data from the geometry data of the read part information. The process data is stored in the mold structure information database 6.

Referring to FIG. 7, when the progress and schedule of the designing process for the mold part that is being designed is input, the design apparatus 100 registers the input progress and schedule in the mold structure information database 6. The input progress and schedule may be stored in the mold structure information database 6 together with part table information, arrangement information, progress information, process information, and related part information.

When designing a mold, an operator may access the mold structure information database 6 from the CAD terminal 10 to check the total number of parts and the number of parts that must be procured. The operator may also estimate the number of operations required to machine a part.

Figure 8:
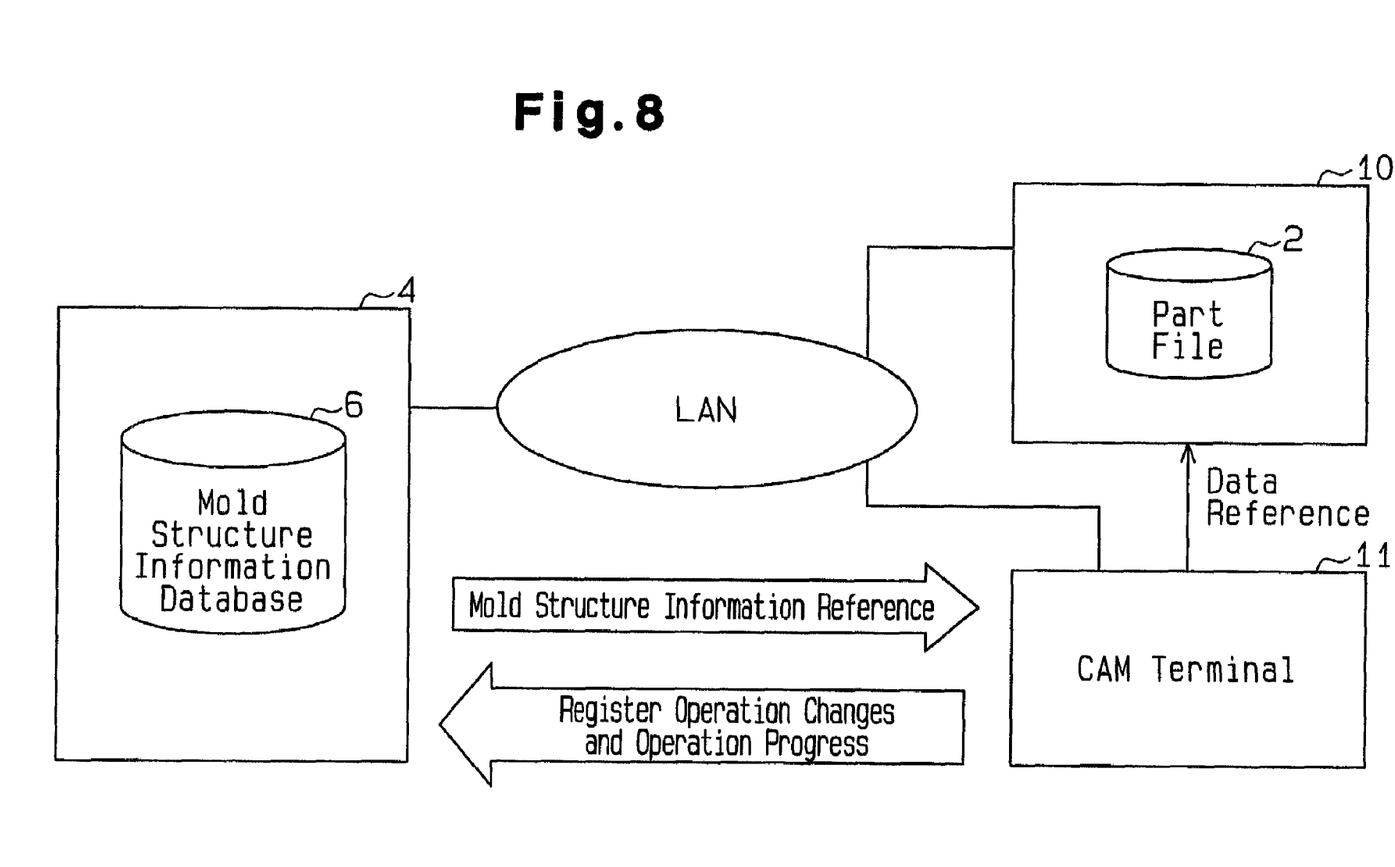

Referring to FIG. 8, the CAD terminal 10, the server computer 4, and a CAM terminal 11 of the CAM system 3 are connected to one another by a local area network (LAN). The operator operates the CAM terminal 11 to read and refer to the information stored in the mold structure information database 6 and the part file 2. Further, the operator operates the CAM terminal 11 to register changes in the operations performed during the CAM process or progress of various operations.

Figure 9:
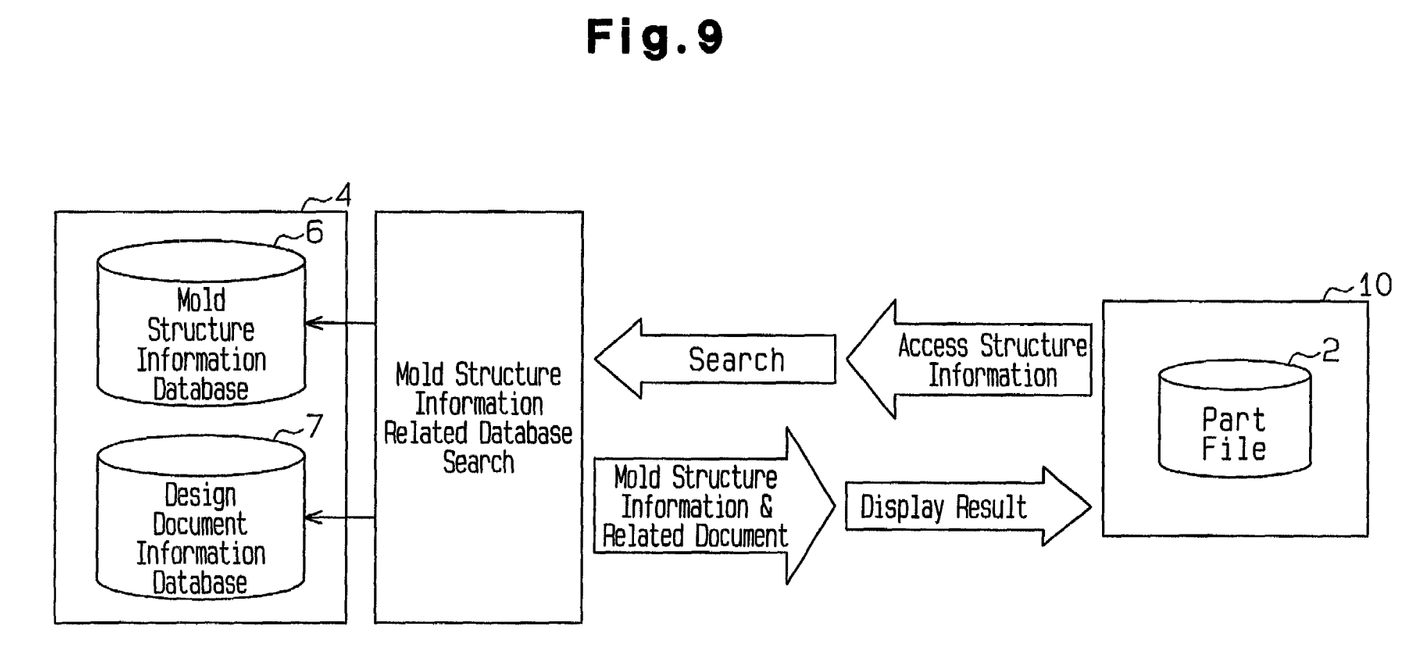

The design apparatus 100 displays the mold structure information, which is stored in the mold structure information database 6. Thus, referring to FIG. 9, the operator may, for example, search for documents that are related with deficient examples and linked to the mold structure information to access the mold structure information and related document from the CAD terminal 10.

Figure 10:
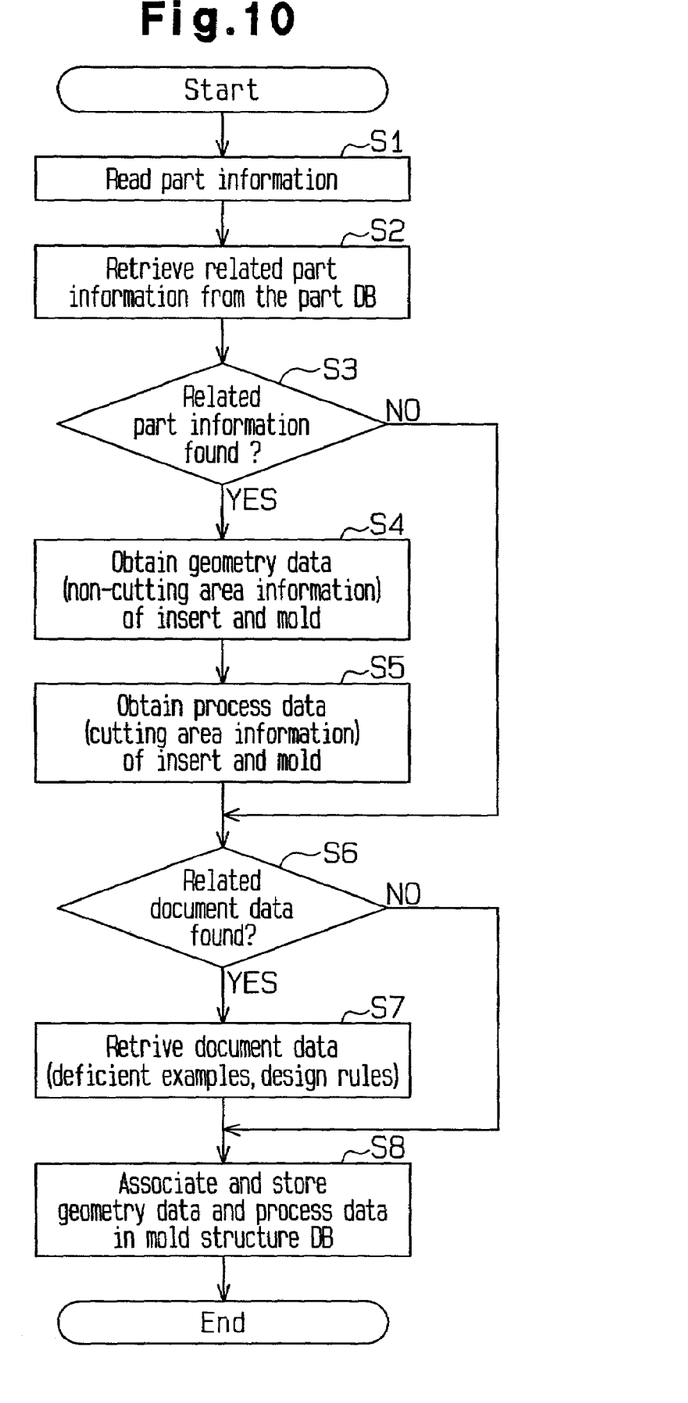
FIG. 10 is a flowchart illustrating a data registration process performed by the mold design apparatus.

The data registering process performed by the design apparatus 100 will now be discussed with reference to FIG. 10.

In step S1, the design apparatus 100 reads part information, which is input by the input device and used to design a mold. In step S2, the design apparatus 100 retrieves the related part information from the part database 5.

When related part information is found (i.e., YES in step S3), the design apparatus 100 proceeds to step S4 and obtains the geometry data of the mold and insert that are being designed. Then, in step S5, the design apparatus 100 obtains the process data of the mold and insert.

When there is no related part information (i.e., NO in step S3, the design apparatus 100 skips steps S4 and S5 and proceeds to step S6.

In step S6, the design apparatus 100 checks whether the design document information database 7 stores document information related to the mold that is being designed. If related document data is found (i.e., YES in step S6), the design apparatus 100 proceeds to step S7 and retrieves the document data.

In step S8, the design apparatus 100 refers to the retrieved document data, corrects the geometry data and the process data when necessary, stores the geometry data and the process data in an associated state, and completes the data registering process. If related document data is not found in step S6, the design apparatus 100 skips step S7 and proceeds to step S8.

Figure 11:
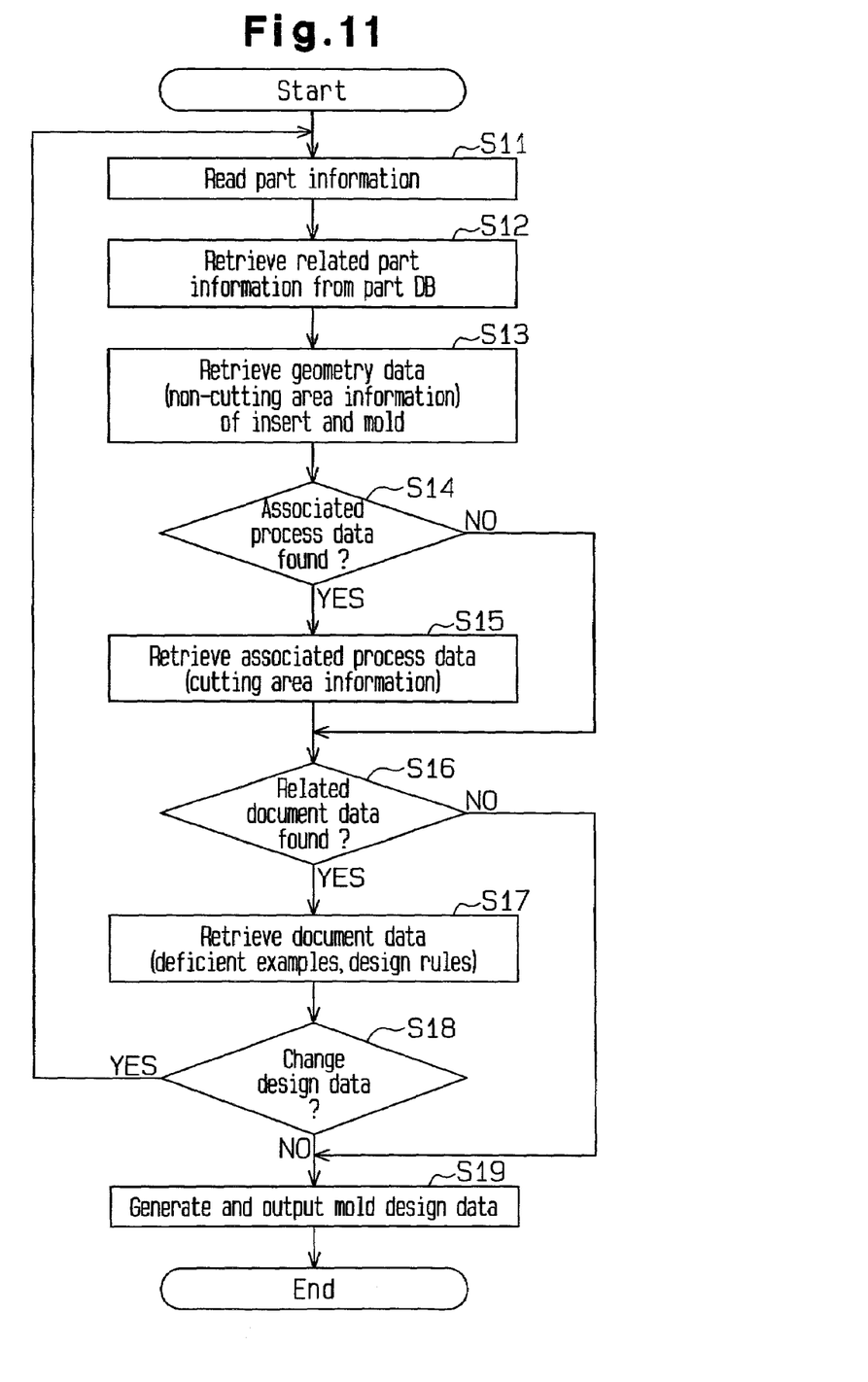
FIG. 11 is a flowchart illustrating a designing process performed by the mold design apparatus.

A mold designing process performed by the design apparatus 100 will now be discussed with reference to FIG. 11.

The input device first inputs part information, which is used to design a mold. In step S11, the design apparatus 100 reads the input part information. In step S12, the design apparatus 100 retrieves the related part information from the part database 5.

In step S13, the design apparatus 100 retrieves geometry data of the mold and insert from the retrieved part information. In step S14, the design apparatus 100 checks whether process data associated with the geometry data of the mold and insert is stored in the structure information database 6. If associated data is found (i.e., YES in step S14), the design apparatus 100 proceeds to step S15 and retrieves the associated process data. If associated data is not found (i.e., NO in step S14), the design apparatus 100 proceeds to step S16.

In step S16, the design apparatus 100 checks whether the design document information database 7 stores document data that is related to the mold, which is being designed. If related document data is found (i.e., YES in step S16), the design apparatus 100 proceeds to step S17 and retrieves the document data. If related document data is not found (i.e., NO in step S16), the design apparatus 100 proceeds to step S19.

In step S18, the operator refers to the retrieved document data and determines whether or not the design data must be changed. If the design data must be changed (i.e., YES in step S18), the design apparatus 100 proceeds to step S11 and repeats the above procedures.

If the design data does not have to be changed (i.e., NO in step S18), the design apparatus 100 proceeds to step S19. In step S19, the design apparatus 100 generates mold design data from the geometry data and the process data and then outputs the generated mold design data.

The design apparatus 100 of the preferred embodiment has the advantages described below.

(1) The external data and process data of a mold part are stored in the mold structure information database 6 in an associated state. Thus, the geometry of cutting area is easily recognized.

(2) The process data, which is associated with the external data, is stored in the mold structure information database 6. Thus, the CAM system 3 may start mold manufacturing processes while the CAD system 1 performs the designing process. Further, the mold may be roughly molded within a short time period.

(3) The part information, which includes the geometry data and the process data, are managed in a hierarchical manner for each mold unit. Accordingly, the operator of the CAD system 1 easily retrieves information that is necessary for designing a mold, such as a part list and progress status of the mold unit. This facilitates the reviewing of a design when changing the design and the understanding of the entire mold structure.

(4) The mold structure information database 6 is shared. Thus, data that is necessary for designing and manufacturing a mold is shared between CAD and CAM operators.

(5) The design apparatus 100 hypothetically assembles mold units and mold parts on the display of the CAD system 1 using process data, which is stored in the mold structure information database 6. In other words, the operator may perform a digital mockup of the mold unit and mold parts with the design apparatus 100. This enables the operator to quickly understand the entire structure of a mold when designing and manufacturing the mold.

(6) The information of the cutting areas is added to the geometry data of the mold unit and the mold parts. Thus, drawings are not required for following processes. Accordingly, one may shift quickly and efficiently from the designing process to the manufacturing process. This would also prevent errors from occurring.

(7) The document data stored in the design document information database 7 enables easy access to progress information and to deficient designing, manufacturing, and assembling examples of past molds. The sharing of designing know-how improves the quality of a mold.

The part database 5, the mold structure information database 6, and the design document information database 7 of the preferred embodiment may be stored in a data storing device other than the server computer 4.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

The invention claimed is:

1. A method for designing a mold that is used to form a molded product and is manufactured by removing a cutting area from a mold material, the method comprising:

generating, based on three-dimensional computer aided design (CAD) solid data of a first mold part stored in a part database, first three-dimensional computer-aided design (CAD) solid data representing geometry of a non-cutting area for designing the first mold part of a mold, and second three-dimensional computer-aided design solid data representing geometry of the cutting area for processing a cavity to insert the first mold part in a second mold part of the mold;

storing the generated first three-dimensional computer-aided design solid data in association with the generated second three-dimensional computer-aided design solid data in a structure information database;

retrieving, based on input of part information for designing a mold, corresponding first three-dimensional computer-aided design (CAD) solid data representing geometry of the non-cutting area of the mold for designing a retrieved first mold part from the part database;

checking whether retrieved second three-dimensional computer-aided design solid data representing geometry of the cutting area for processing a cavity to insert the retrieved first mold part to a second mold part of the mold is stored in the structure information database in association with the retrieved three-dimensional computer aided design solid data; and if said checking determines that the retrieved second three-dimensional computer-aided design solid data is stored in the structure information database, designing the mold using the retrieved first three-dimensional computer-aided design solid data representing the geometry of the non-cutting area for designing the first mold part, and the retrieved second three-dimensional computer-aided design solid data representing the geometry of the cutting area for processing a cavity to insert the first mold part in the second mold part of the mold, wherein the first mold part and the second mold part are in a mating relationship.

2. The method according to claim 1, wherein the mold is a mold unit formed from a plurality of mold parts forming the molded product, the first three-dimensional computer-aided design solid of the non-cutting area includes pieces of three-dimensional computer-aided design solid data representing geometries of the mold parts, the second three-dimensional computer-aided design solid data includes pieces of three-dimensional computer-aided design solid data representing geometries of the cutting area of the mold parts, and the storing includes storing the pieces of first three-dimensional computer-aided design solid data and the pieces of second three-dimensional computer-aided design solid data in association with the mold unit and in a hierarchical manner.

3. The method according to claim 1, wherein the designing includes referring to past process information stored in a design document information database.

4. The method according to claim 1, wherein the cutting area includes a cavity of the mold.

5. The method according to claim 1, wherein the designing includes:

referring to the database that stores previously-generated first and second three-dimensional computer-aided design solid data of previously-stored molds; and retrieving pieces of the previously-generated first and second three-dimensional computer-aided design solid data of previously-stored molds from the database.

6. An apparatus for designing a mold that is used to form a molded product and is manufactured by removing a cutting area from a mold material, the apparatus comprising:

a part database storing three-dimensional computer-aided design (CAD) solid data of a first mold part;

a structure information database storing first three-dimensional computer-aided design (CAD) solid data representing geometry of a non-cutting area of a mold for designing a first mold part of the mold, and second three-dimensional computer-aided design solid data representing geometry of the cutting area for processing a cavity to insert the first mold part to a second mold part of a mold, the first three-dimensional computer-aided design (CAD) solid data and second three-dimensional computer-aided design (CAD) solid data being generated based on the three-dimensional computer-aided design (CAD) solid data of the first mold part stored in the part database, wherein the first three-dimensional computer-aided design solid data is associated with the second three-dimensional computer-aided design solid data; and a CAD system generating design data of the mold from the first and second three-dimensional computer-aided design solid data, wherein the CAD system is configured to:

retrieve, based on an input of a part information for designing a mold, related three-dimensional computer-aided design (CAD) solid data representing a geometry of the non-cutting area of the mold for designing a first mold part from the part database;

check whether second three-dimensional computer-aided design solid data representing geometry of the cutting area for processing a cavity to insert the first mold part to a second mold part of the mold is stored in the structure information database in association with the retrieved three-dimensional computer aided design solid data; and if said checking determines that the second three-dimensional computer-aided design solid data is stored in the structure information database, design the mold using the retrieved three-dimensional computer-aided design solid data representing the geometry of the non-cutting area of the mold material for designing the first mold part of the mold, and the second three-dimensional computer-aided design solid data representing the geometry of the cutting area for processing a cavity to insert the first mold part to the second mold part of the mold, wherein the first mold part and the second mold part are in a mating relationship; and a computer-aided manufacturing (CAM) system managing manufacturing of the mold in accordance with the first and second three-dimensional computer-aided design solid data and the design data.

7. The apparatus according to claim 6, wherein the CAD system includes at least one CAD terminal computer, and the CAM system includes at least one CAM terminal computer, the at least one CAD terminal computer and the at least one CAM terminal computer sharing the database.

* * * * *

UNITED STATES PATENT AND TRADEMARK OFFICE
CERTIFICATE OF CORRECTION

PATENT NO.         : 7,526,360 B2                                           Page 1 of 1
APPLICATION NO.    : 10/125516
DATED              : April 28, 2009
INVENTOR(S)        : Akira Oshitani et al.

It is certified that error appears in the above-identified patent and that said Letters Patent is hereby corrected as shown below:

Title Page, Column 1 item (75); (Inventors), Lines 1-2, change "Hatsuko Kouroku," to --Hatsuko Koroku,--.

Signed and Sealed this

Fourth Day of August, 2009

JOHN DOLL
*Acting Director of the United States Patent and Trademark Office*